(No Model.)
E. L. KRAUSER.
NUT LOCK.
No. 505,468. Patented Sept. 26, 1893.
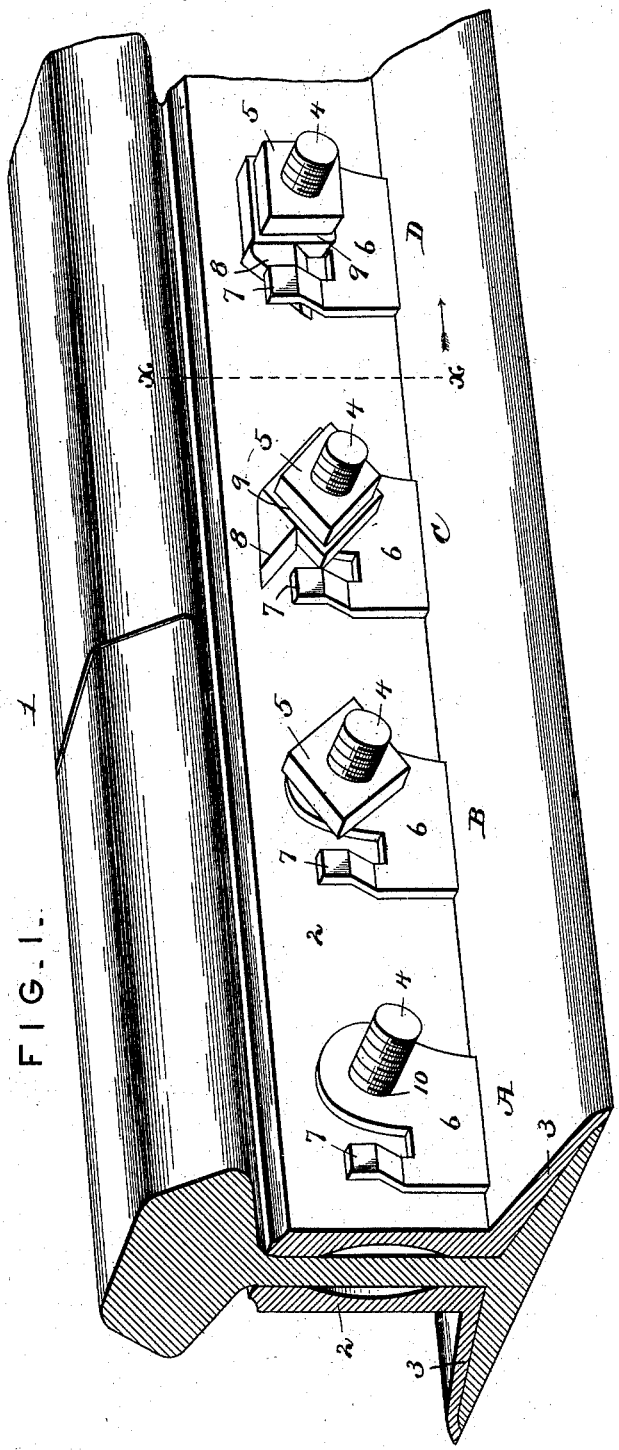
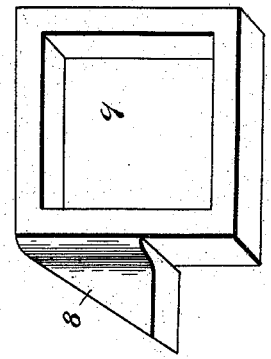
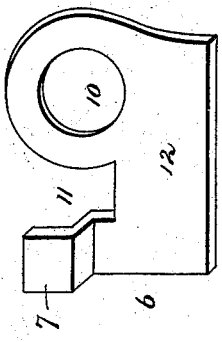
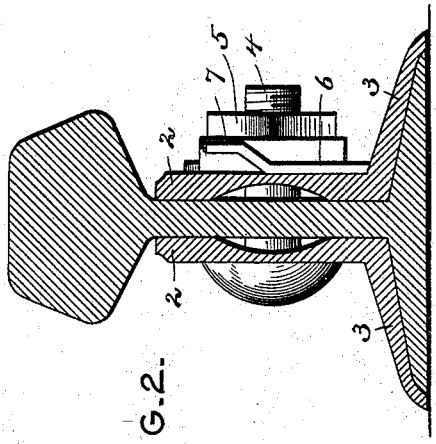
Witnesses
Harry L. Amer.
Inventor
Evan L. Krauser.
By his Attorneys,
C. A. Snow & Co.

UNITED STATES PATENT OFFICE.

EVAN L. KRAUSER, OF NORRISTOWN, PENNSYLVANIA.

NUT-LOCK.

SPECIFICATION forming part of Letters Patent No. 505,468, dated September 26, 1893.

Application filed June 16, 1893. Serial No. 477,820. (No model.)

*To all whom it may concern:*

Be it known that I, EVAN L. KRAUSER, a citizen of the United States, residing at Norristown, in the county of Montgomery and State of Pennsylvania, have invented a new and useful Nut-Lock, of which the following is a specification.

My invention relates to an improved nut lock, and it has for its object to provide a simple and effective device which may be drop-forged or struck from bars or sheets by a suitable die to avoid casting; and furthermore to provide a construction whereby a single nut or any desired number may be locked thereby.

Further objects and advantages of the invention will appear in the following description, and the novel features thereof will be particularly pointed out in the appended claims.

In the drawings: Figure 1 is a perspective view of a series of nut-locking devices embodying my invention, applied to a railway-rail joint, the parts being shown in the several positions which they assume in applying the lock. Fig. 2 is a vertical transverse sectional view on the line *x—x* of Fig. 1. Figs. 3 and 4 are detail views in perspective of the members of the lock.

Similar numerals and letters of reference indicate corresponding parts in all the figures of the drawings.

1 represents the contiguous ends of two rails, 2 a fish-plate which is angular in cross-section, being provided with a horizontal base-flange 3. 4 represents the bolts which are arranged in registering perforations in the rails and fish-plate, and 5 the nuts which are threaded upon such bolts.

The improved nut lock comprises, essentially, a washer 6, provided with an upstanding lip 7, and a tongue 8, provided with an angular eye 9, to receive the nut. Said washer is provided with an opening 10, of a size to fit the bolt, whereby the nut may be screwed down upon the surface thereof to hold the same firmly in position. The washer is further provided with a lateral wing 11, which is provided with a straight base-edge 12, adapted to bear upon the surface of the base-flange of the fish-plate, or upon any other fixed horizontal surface; and at the terminal of this wing is formed an upstanding lip 7, which is offset from the plane of the wing to provide an interval between its rear surface and the contiguous surface of the fish-plate. The tongue 8 is of a thickness corresponding with the amount of offset of the lip 7, and projects slightly in rear of the plane of the rear side of the integral angular eye 9. This eye may be square or hexagonal, or of any other shape, to correspond with that of the nut to which it is to be applied.

Referring to Fig. 1, at A I have shown the washer applied in the operative position to a bolt before the nut is engaged therewith; at B is shown the position of the nut preparatory to the application thereto of the tongue-carrying eye; at C is shown the position of the parts after the application of the tongue; and at D is shown the position of the parts after the nut has been backed or loosened sufficiently to cause the tongue to engage under the offset lip. From the above description it will be understood that the nut is screwed down tightly upon the washer, and the eye is then applied thereto in such a position as to cause the tongue to lie upon the surface of the fish-plate adjacent to the free end of the lip, after which the nut is loosened and the tongue caused to engage with the lip. The nut may be released by again tightening it sufficiently to disengage the tongue from the lip, but such operation of the parts cannot be caused by jarring, inasmuch as it necessitates the tightening of the nut, and furthermore the tongue is arranged upon the descending side of the nut and hence jarring will tend to more firmly connect the parts.

Various changes in the form, proportion, and the minor details of construction may be resorted to without departing from the principle or sacrificing any of the advantages of this invention.

Having described my invention, what I claim is—

1. A nut locking device comprising a washer provided with a lateral wing having a terminal upstanding lip which is offset from the plane of the washer, and a tongue to engage said lip provided with an integral angular eye to engage a nut, said tongue being offset at its rear side from the plane of the eye to bear upon the surface of the fish-plate and being of a thickness which is equal to the interval between the rear surface of the lip and the contiguous surface of the fish-plate to fit snugly in said interval, substantially as specified.

2. The combination with an angular fish-plate, a bolt, and a nut threaded upon said bolt, of a washer provided with an opening to receive the bolt and having a lateral wing with a straight base edge to engage the base-flange of the fish-plate, an upstanding lip integral with the wing of the washer and offset from the plane thereof to form an interval between its rear side and the contiguous surface of the fish-plate, the nut being adapted to bear upon said washer to hold the latter in contact with the fish-plate, a tongue to engage said lip, and an angular eye integral with the tongue and fitting upon the nut to hold the tongue in contact with the surface of the fish-plate, substantially as specified.

In testimony that I claim the foregoing as my own I have hereto affixed my signature in the presence of two witnesses.

EVAN L. KRAUSER.

Witnesses:
  HENRY G. UNGER,
  CLARENCE K. EMERY.